United States Patent
Piccinelli et al.

(10) Patent No.: US 7,160,969 B2
(45) Date of Patent: Jan. 9, 2007

(54) ROMP WITH ALKOXY ETHER GROUPS

(75) Inventors: Piero Piccinelli, Sasso Marconi (IT); Manuel Vitali, Bologna (IT); Alessandro Zedda, Basel (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 639 days.

(21) Appl. No.: 10/093,983

(22) Filed: Mar. 8, 2002

(65) Prior Publication Data

US 2002/0185630 A1 Dec. 12, 2002

(30) Foreign Application Priority Data

Mar. 12, 2001 (EP) .................................. 01810246

(51) Int. Cl.
*C08F 132/08* (2006.01)
(52) U.S. Cl. .................. 526/280; 526/281; 526/332
(58) Field of Classification Search ................ 526/280, 526/281, 332
See application file for complete search history.

(56) References Cited

U.S. PATENT DOCUMENTS

| 4,645,814 A | 2/1987 | Grubbs et al. ............... 526/256 |
| 5,069,943 A | 12/1991 | Hara et al. .................. 427/400 |
| 5,262,233 A | 11/1993 | Sudo et al. .................. 428/327 |
| 5,880,231 A * | 3/1999 | Grubbs et al. ............... 526/171 |
| 6,008,306 A | 12/1999 | Hafner et al. ................ 526/171 |
| 6,476,167 B1 * | 11/2002 | Peters ......................... 526/209 |

FOREIGN PATENT DOCUMENTS

| CA | 2242060 | 1/1999 |
| DE | 19718288 | 11/1997 |
| EP | 0889107 | 1/1999 |
| WO | 98/54173 | 12/1998 |
| WO | 99/00396 | 1/1999 |
| WO | 00/55218 | 9/2000 |
| WO | WO 00/55218 | * 9/2000 |
| WO | 00/68218 | 11/2000 |

OTHER PUBLICATIONS

English Abstract for DE 19718288 (1997).

* cited by examiner

*Primary Examiner*—Robert D. Harlan
(74) *Attorney, Agent, or Firm*—Tyler A. Stevenson

(57) ABSTRACT

The invention relates to metathesis oligomers wherein one or more alkoxy ether groups are attached to the oligomer moiety. Also disclosed is a polymerizable composition comprising a catalytically effective amount of a penta- or hexavalent ruthenium or osmium carbene catalyst, the process for preparing the metathesis polymer by applying the reaction conditions of Ring Opening Metathesis Polymerization (=ROMP) to the polymerisable composition; and various technical applications of the metathesis oligomers as antifog agents.

3 Claims, No Drawings

ROMP WITH ALKOXY ETHER GROUPS

The invention relates to compounds wherein one or more alkoxy ether groups are attached to an oligomer moiety and to the use of these compounds for preventing the fog formation from humidity under polymer films.

The invention particularly relates to metathesis oligomers wherein a surface active alkoxy ether group, particularly a polyalkoxy ether group, is attached to the oligomer; a polymerisable composition comprising a catalytically effective amount of a penta- or hexavalent ruthenium or osmium carbene catalyst; the process for preparing the metathesis polymer by applying the reaction conditions of Ring Opening Metathesis Polymerisation (=ROMP) to the polymerisable composition; and various technical applications of the metathesis oligomers.

Films and foils for agricultural and horticultural applications, so-called agricultural films, are used as covers for greenhouse cultures or as protecting covers for open field cultures, e.g. so-called under foil cultures or tunnel cultures, depending on the size and the height of the plant. The atmosphere under these films and foils is saturated with water vapour, which evaporates from the soil or from the plants. The water vapour then condenses to droplets on the inner surface of the films. This reduces the intensity of the incident sunlight and increases the risk of plant diseases. The reduction in light transmission slows down the rate of plant growth; delays crop maturity and reduces the crop yield per plant.

Another problem closely related to this one applies to so-called food packaging films when food, e.g. meat products, are packaged on trays and wrapped with a plastic film at room temperature. When these packages are placed in a refrigerator at around 4° C., the air enclosed in the package is oversaturated and the water condenses as water droplets onto the film's surface.

The term fogging is used to describe the condensation of water vapour on a plastic film's surface in the form of small, discrete water droplets. Fogging results when an enclosed mass of air containing water vapour cools to a temperature below its dew point. The phenomenon is very much dependent upon the temperature and relative humidity of the enclosed water vapour/air mixture, as well as the temperature of the contact film.

To overcome these problems, polymer films are modified with antifogging additives. The modified plastic films do not prevent the formation of condensation per se. However, while water vapour condenses on such films, antifogging additives migrate to the surface of the film, causing the condensate to spread evenly over the film's surface and run off instead of forming droplets, cf. *Plastics Additives Handbook*, 5th Edition 2001, Hans Zweifel Ed., *HANSER* (Hanser Publisher Munich, Hanser Gardner Publications, Inc. Cincinnati) *ISBN* 3-446-21654-5, pages 609–626.

Representative antifogging additives are glycerol monooleate, polyglycerol esters, sorbitan esters, ethoxylated sorbitan esters, and nonylphenol ethoxylate or ethoxylated alcohols. As representative state of the art U.S. Pat. No. 5,262,233 is cited, which discloses the incorporation of polyethylene oxide alkyl ethers as non-ionic surfactants in agricultural polymeric films.

Antifogging additives can be incorporated within the polymer matrix as pure additives or as master batches or concentrates. Typical antifogging additive concentrations range between 1 and 3%. However, the additives have the undesirable property of migrating to the surface of the film. In a mono-layer film, the antifogging additives migrate in both directions, towards the inside of the agricultural film where the antifogging effect is desirable, but also to the outside of the film where it is unnecessary. On the outside of the polymer film, antifogging additive is lost as it is washed off by rain.

Surfactant molecules coatings have the undesirable property of forming a weak attachment to polymeric films or foils, particularly polyethylene films, and are washed away by the action of heat and humidity. Therefore, there is a need for improved polymer films, which resist fogging when they are exposed for a longer period of time to conditions of higher temperatures and humidity.

To overcome this problem, three layer films have been developed and commercialised. The middle layer is about 50% of the total film thickness, while the inside and outside layers is each approximately 25% of the total film thickness. The inside layer contains about 1% antifogging additive to provide immediate antifogging effect after placing the film on the agricultural field. The polymer film is typically a PE (=polyethylene)-EVA (=ethylene vinyl acetate) copolymer with a low level of vinyl acetate, e.g. 4 to 6%. In the middle layer is the bulk of the antifogging additive, which provides the long-term fogging effect. The concentration of the antifogging additive in this layer is between 3 and 5%. The polymer used for this layer is a PE-EVA copolymer with a high level of vinyl acetate, e.g. 14 to 18%. The outside layer is a barrier layer based on PE. This layer contains no or very little antifogging additive. When the antifogging additive from the inside layer is consumed and washed off, some of the antifogging additive in the middle layer migrates into the inside layer. A large number of commercial products is available from different suppliers under various trade names, e.g. Glycolube® (Lonza, CH-Basel), Loxiol® (Henkel, DE-Düsseldorf) or Armofog® (Akzo, NL-Amersfoort).

Three layer films improve the properties of agricultural films to some degree, but do not overcome the problem that surfactants materials are lost caused by washing off from the films. Moreover, three layer films require the application of difficult extrusion techniques by co-extrusion with different polymer materials.

It has surprisingly been found out that the efficiency of films and foils to resist fogging is increased if oligomers obtained by ROMP containing surface-active alkoxy ether groups are added to the polymers. The non-ionic alkoxy ether groups are directly linked to the oligomer structure by chemical bonds, such as ether or ester bonds.

Thermal ROMP of cycloolefins other than cyclohexene has acquired great importance. This method requires appropriate catalysts. Catalysts of particular interest for ROMP are so-called metal carbenes, for example ruthenium and osmium complexes, bearing the group =CR*R** (wherein one of R* and R** represents hydrogen and the other represents phenyl, alkyl or alkenyl or both represent alkyl or alkenyl) attached to the central metal atom [WO 93/20111; S. Kanaoka et al., *Macromolecules* 28:4707–4713 (1995); C. Fraser et al., *Polym. Prepr.* 36:237–238 (1995); P. Schwab et al., *Angew. Chem.* 107:2179–2181 (1995)]. WO 99/00396 discloses compositions of pentavalent and hexavalent ruthenium and osmium carbene complex catalysts in admixture with dicyclopentadiene or cycloolefins other than cyclohexene.

Therefore, the present invention relates to a compound of the formula

wherein
- one of m and n represents zero, one or a numeral greater than one and the other one represents one or a numeral greater than one, with the proviso that the sum of m and n is at least two;
- p and q represent independently of one another represent zero, one or a numeral greater than one;
- A and B represent chain terminal groups from the chain transfer agent A—B;
- X and X' independently of one another represent unsaturated or hydrogenated repeating units from cycloolefins polymerised by metathesis;
- Y and Y' represent identical or different bivalent groups; and
- Z, Z' and Z" independently of one another represent alkoxy ether groups selected from the group consisting of hydroxy-$C_2$–$C_5$alkoxy, dihydroxy-$C_3$–$C_7$alkoxy, hydroxy-$C_2$–$C_3$alkoxy-poly-$C_2$–$C_3$alkoxy, dihydroxy-$C_2$–$C_3$alkoxy-poly-$C_2$–$C_3$alkoxy and $C_1$–$C_4$alkoxy-poly-$C_2$–$C_3$alkoxy; or
- Z, Z' and Z" independently of one another represent alkoxy ether groups selected from the group consisting of dihydroxy-$C_3$–$C_7$alkoxy and dihydroxy-$C_2$–$C_3$alkoxy-poly-$C_2$–$C_3$alkoxy, wherein hydroxy is etherified by another group

A—X"—B, wherein A—B represent chain terminal groups from the chain transfer agent A—B and X" represents unsaturated or hydrogenated repeating units from cycloolefins polymerised by metathesis.

The terms and definitions used in the description of the present invention preferably have the following meanings:

In the compound (I) one of m and n represents zero, one or a numeral greater than one and the other one represents one or a numeral greater than one. The sum of m and n is at least two. The indices m and n have no real upper limits. In a preferred embodiment, the sum of m and n has a range from 2 to 50, preferably 5 to 20, whereas 5 to 10 are particularly preferred. In another preferred embodiment, one of m and n is a numeral from 2 to 50 and the other one is zero.

The indices p and q independently of one another represent zero, one or a numeral greater than one and the other one represents one or a numeral greater than one. In a preferred embodiment, p and q are zero. In that event, there are no groups Z and Z' attached to either one of X and X'. Only Z" has the meanings mentioned above.

The formula I comprises any polymeric compound wherein the lowest total number of repeating units X and X' is two. In that event, the sum of m and n is two. The formula I comprises any polymeric compounds of low molecular weight, such as oligomers or cooligomers, or homopolymers and copolymers of higher molecular weight, for example block, multi-block or gradient copolymers as well as copolymers characterised by a random, hyper-branched, star-shaped or dendritic arrangement of the polymer units as well as graft copolymers.

The compounds (I) are obtainable by metathesis polymerisation, as opposed to other methods of polymerisation, such as ionic or free radical polymerisation. Metathesis polymerisation is characterised by the ring-opening polymerisation of cycloalkenes initiated by olefin metathesis catalysts, cf. *Concise Encyclopaedia of Polymer Science and Engineering*, J. I. Kroschwitz (editor), J. Wiley & Sons USA, 1990 Edition, *ISBN* 0-471-51253-2, pg. 611. Representative cycloalkenes polymerisable by this method include dicyclopentadiene, norbornadiene, norbornene, cyclooctene and cyclooctadiene.

The polymerisation by metathesis is performed in the presence of chain transfer agents (CTA) of the formula A—B wherein A and B represent chain terminal groups. Chain transfer agents are used to regulate and limit the molecular weight in a polymer reaction, cf. F. W. Billmeyer, *Polymer Science, ISBN* 0-471-03196-8, pg. 63.

Suitable chain transfer agents are open chain alkenes, e.g. propylene, n-butene, n-hexene or n-octene, which are present in the compound (I) as identical or different terminal alkyl groups A and B. In a particularly preferred embodiment A and B are different and p and q are zero. One of A and B represent methyl and the other one represent linear $C_2$–$C_7$alkyl, e.g. n-propyl, n-pentyl or n-heptyl.

In that preferred embodiment the alkoxy ether group Z", particularly dihydroxy-$C_3$–$C_5$alkoxy, methoxy-polyethoxy, polyethoxy, methoxy-poly-n-propoxy, and ethoxy-poly-n-propoxy, is attached to the terminal groups of longer chain length. In the event that propylene is substituted by the alkoxy ether groups, e.g. allyl polyalkoxy ethers, one of A and B is methyl and the other one is ethyl substituted by polyalkoxy. There are no alkoxy ether groups substituting the repeating units X and X'.

The term cycloolefin polymerised or polymerisable by metathesis defining X and X' includes monocyclic cycloolefins other than cyclohexene and polycyclic, polycyclic condensed (fused) or bridged or polycyclic condensed (fused) and bridged cycloolefins. The individual rings in these cycloolefins consist of 3 to 16, especially 3 to 12, and preferably 3 to 8 ring members and may contain heteroatoms selected from the group consisting of O, S, N and Si and additional substituents selected from the group consisting of $C_1$–$C_4$alkyl, e. g. methyl or ethyl, $C_1$–$C_4$alkoxy, e. g. methoxy or ethoxy, halogen, e.g. chloro or bromo, cyano and trifluoromethyl.

A preferred group includes cycloolefins polymerised by metathesis selected from the group consisting of cyclopropene, cyclobutene, cyclopentene, cycloheptene, cyclooctene, cyclopentadiene, dicyclopentadiene, cyclohexadiene, cycloheptadiene, cyclooctadiene, norbornadiene, norbornene and norbornene derivatives.

Another preferred group of cycloolefins includes bi-, tri-, tetra- and pentacyclic bridged cycloolefins obtainable by a Diels-Alder type addition reaction of dienes with so-called dienophiles. The individual rings in these bridged cycloolefinic adducts may be condensed with monocyclic or bicyclic carbocyclic aromatic groups, such as benzene or naphthalene, or with monocyclic or bicyclic heterocyclic aromatic groups, such as thiophene, furan, pyridine or quinoline.

This preferred group of cycloolefins includes carbocyclic bi-, tri-, tetra- and pentacyclic bridged cycloolefins obtainable by a Diels-Alder type addition reaction, especially cycloolefins by Diels-Alder reaction of cyclopentadiene with suitable dienophiles.

A preferred group of cycloolefins of this type includes monomers based on norbornene and norbornadiene selected from the group consisting of norbornene-2, 5-methoxycarbonylnorbornene-2, 5-methyl-5-methoxycarbonyl-norbornene-2, 5-cyanonorbornene-2, 5-methyl-5-cyanonorbornene, 5,5-dicyano-norbornene-2, 1,4,5,8-dimethano-1,4,4a,5,6,7,8,8a-octahydronaphthaline, 6-methyl-1,4,5,8-dimethano-1,4,4a,5,6,7,8,8a-octahydronaphthaline, 6-methyl-6-methoxycarbonyl-1,4,5,8-dimethano-1,4,4a,5,6,7,8,8a-octahydronaphthaline, 6-methoxycarbonyl-1,4,5,8- dimethano-1,4,4a,5,6,7,8,8a-octahydronaphthaline, 6-cyano-1,4,5,8-dimethano-1,4,4a,5,6,7,8,8a-octahydronaphthaline, 6-ethyl-1,4,5,8-dimethano-1,4,4a,5,6,7,8,8a-octahydronaphthaline, 6-ethylidene-1,4,5,8-dimethano-1,4,4a,5,6,7,8,8a-octahydronaphthaline, 6,7-dimethyl-1,4,5,8-dimethano-1,4,4a,5,6,7,8,8a-octahydronaph-thaline, 1,4-dimethano-1,4,4a,9a-tetrahydrofluorene, dicyclopentadiene, tricyclopentadiene, tetracyclopentadiene, tetracyclododecene and methyl tetracyclododecene.

The bivalent groups Y and Y' are present in the event that one of p and q is one or a numeral greater than one. Preferred meanings of Y and Y' are —C(=O)—, —O—C(=O)— and $C_1$–$C_8$alkylene, e.g. ethylene.

In the compound (I) Z, Z' and Z" independently of one another represent alkoxy ether groups selected from the group consisting of hydroxy-$C_2$–$C_5$alkoxy, dihydroxy-$C_3$–$C_7$alkoxy, hydroxy-$C_2$–$C_3$alkoxy-poly-$C_2$–$C_3$alkoxy and $C_1$–$C_4$alkoxy-poly-$C_2$–$C_3$alkoxy. In a preferred embodiment of the invention p and q are zero. In that event there are no groups Z and Z' attached to either one of X and X'. Only Z" has the meanings mentioned above.

Hydroxy-$C_2$–$C_5$alkoxy is, for example 2-hydroxyethoxy or 2- or 3-n-hydroxypropoxy.

Dihydroxy-$C_3$–$C_7$alkoxy is, for example, 2,3-dihydroxypropoxy or 2,3- or 3,4-dihydroxy-n-butoxy.

Hydroxy-$C_2$–$C_3$alkoxy-poly-$C_2$–$C_3$alkoxy is a substituent derived from polyethylene glycol or polypropylene glycol (=polyethylene oxide or polypropylene oxide) or mixed polymerisates thereof and is represented by the following partial formula

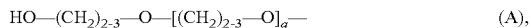
HO—(CH$_2$)$_{2-3}$—O—[(CH$_2$)$_{2-3}$—O]$_a$—　　(A), wherein a is a numeral from 1 to about $1.0 \times 10^5$, preferably 1 to 2000, especially 1 to 200.

Dihydroxy-$C_2$–$C_3$alkoxy-poly-$C_2$–$C_3$alkoxy is a substituent derived from polyethylene glycol or polypropylene glycol (=polyethylene oxide or polypropylene oxide) or mixed polymerisates thereof and is represented by the following partial formula

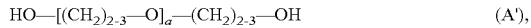
HO—[(CH$_2$)$_{2-3}$—O]$_a$—(CH$_2$)$_{2-3}$—OH　　(A'), wherein a is a numeral from 1 to about $1.0 \times 10^5$, preferably 1 to 2000, especially 1 to 200.

Hydroxy-$C_2$–$C_3$alkoxy-poly-$C_2$–$C_3$alkoxy is derived from polyethylene glycol and is represented by the following partial formula

HO—C$_2$H$_4$—O—(C$_2$H$_4$—O)$_{a'}$—　　(A"), wherein a' is a numeral from 1 to about $1.0 \times 10^5$, preferably 1 to 2000, especially 1 to 200.

Hydroxy-$C_2$–$C_3$alkoxy-poly-$C_2$–$C_3$alkoxy derived from polypropylene glycol is represented by the following partial formula

HO—C$_3$H$_6$—O—(C$_3$H$_6$—O)$_{a''}$—　　(A'''), wherein a" is a numeral from 1 to about $1.0 \times 10^5$, preferably 1 to 2000, especially 1 to 200.

Hydroxy-$C_2$–$C_3$alkoxy-poly-$C_2$–$C_3$alkoxy preferably has a linear structure.

$C_1$–$C_4$alkoxy-poly-$C_2$–$C_3$alkoxy is a substituent derived from polyethylene glycol or polypropylene glycol (=polyethylene oxide or polypropylene oxide) or mixed polymerisates wherein the terminal hydroxy group is etherified with $C_1$–$C_4$alkyl, preferably methyl or ethyl.

$C_1$–$C_4$alkoxy-poly-$C_2$–$C_3$alkoxy is represented by the following partial formula

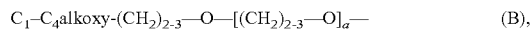
C$_1$–$C_4$alkoxy-(CH$_2$)$_{2-3}$—O—[(CH$_2$)$_{2-3}$—O]$_a$—　　(B), wherein a is a numeral from 1 to about $1.0 \times 10^5$, preferably 1 to 2000, especially 1 to 200.

Preferred meanings are methoxy-polyethoxy, polyethoxy, methoxy-poly-n-propoxy and ethoxy-poly-n-propoxy.

In another embodiment of the invention, Z, Z' and Z" independently of one another represent alkoxy ether groups selected from the group consisting of dihydroxy-$C_3$–$C_7$alkoxy and dihydroxy-$C_2$–$C_3$alkoxy-poly-$C_2$–$C_3$alkoxy, particularly dihydroxy-$C_2$–$C_3$alkoxy-poly-$C_2$–$C_3$alkoxy (A'), and wherein hydroxy is etherified by another group

A—X"—B, wherein A—B represent chain terminal groups from the chain transfer agent A—B and X" represents unsaturated or hydrogenated repeating units from cycloolefins polymerised by metathesis. The synthesis of a representative transfer agent is illustrated by the following reaction sequence:

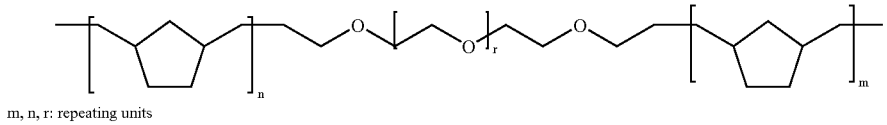
r: repeating unit.

The "bivalent" chain transfer agent may then polymerise another cycloolefin moiety as follows:

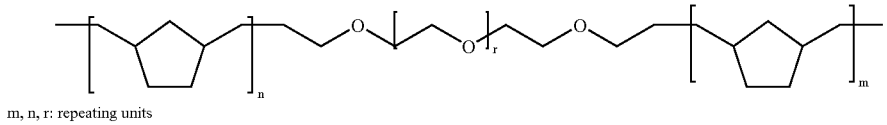
m, n, r: repeating units

The present invention particularly relates to compounds (I), wherein p and q represent zero;
 one of m and n represents a numeral from 2 to 20 and the other one represents zero;
 A and B represent chain terminal groups from the chain transfer agent $C_3$–$C_8$alkene;
 X and X' independently of one another represent an unsaturated or hydrogenated repeating unit from cycloolefins polymerised by metathesis selected from the group consisting of cyclopropene, cyclobutene, cyclopentene, cycloheptene, cyclooctene, cyclopentadiene, dicyclopentadiene, cyclohexadiene, cycloheptadiene, cyclooctadiene, norbornadiene, norbornene and norbornene derivatives;

Y and Y' independently of one another represent bivalent groups selected from the group consisting of —C(=O)—, —O—C(=O)— and $C_1$–$C_8$alkylene; and Z, Z' and Z" independently of one another represent an alkoxy ether group selected from the group consisting of dihydroxy-$C_3$–$C_5$alkoxy, methoxy-polyethoxy, polyethoxy, methoxy-poly-n-propoxy, and ethoxy-poly-n-propoxy.

Highly preferred are compounds (I), wherein p and q represent zero;

one of m and n represents a numeral from 2 to 20 and the other one represents zero;

A and B represent chain terminal groups from the chain transfer agent $C_3$–$C_8$alkene;

X and X' independently of one another represent an unsaturated or hydrogenated repeating unit from cycloolefins polymerised by metathesis selected from the group consisting of cyclopentadiene, dicyclopentadiene, norbornadiene, norbornene and norbornene derivatives; and Z" represents an alkoxy ether group selected from the group consisting of dihydroxy-$C_3$–$C_5$alkoxy, methoxy-polyethoxy, polyethoxy, methoxy-poly-n-propoxy, and ethoxy-poly-n-propoxy.

The following compounds are especially preferred:

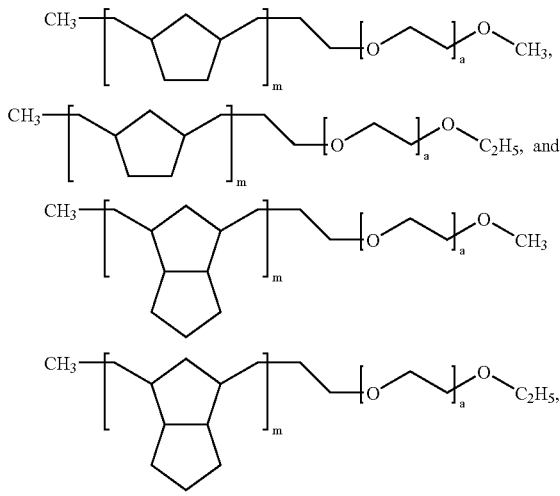

wherein m represents a numeral from 5 to 20.

Another preferred group relates to compounds of the formulae

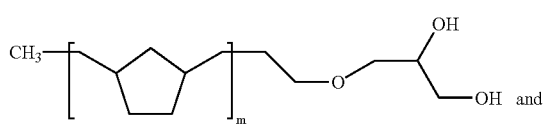

and

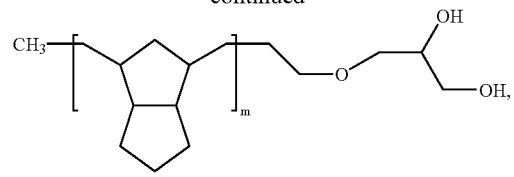

wherein m represents a numeral from 5 to 20.

The present invention also relates to a polymerisable composition comprising
a) a catalytically effective amount of a penta- or hexavalent ruthenium or osmium carbene catalyst capable of performing ring opening metathesis polymerisation of cycloolefins; and
b) the chain transfer agent A—B and monomers capable of forming a compound of the formula (I), wherein A, B, X, X', Y, Y', Z, Z', Z", p, q, m and n are as defined above.

A suitable penta- or hexavalent ruthenium or osmium carbene catalyst present in the composition mentioned above is described on pages 12–44 of *Olefin Metathesis and Metathesis Polymerization;* K. J. Ivin, J. C. Mol. Academic Press, ISBN 0-12-377045-9.

A particularly suitable penta- or hexavalent ruthenium or osmium carbene catalyst is represented by the formulae

(IIa)

(IIb)

wherein

Me represents ruthenium or osmium;

$L_a$ and $L_b$ independently of one another represent anionic ligands;

$L^1$, $L^2$ and $L^3$ independently of one another represent monodentate donor ligands; and R represents aryl, arylthio, or $C_3$–$C_5$alkenyl.

The polymerisable compositions comprising as component a) the penta- or hexavalent ruthenium or osmium carbene catalysts (IIa) and (IIb) defined above and as component b) the chain transfer agent capable of forming the compound (I) defined above are a preferred embodiment of the invention.

The anionic ligands $L_a$ and $L_b$ are, for example, hydride ions ($H^-$) or are derived from inorganic or organic acids, examples being halides, e.g. $F^-$, $Cl^-$, $Br^-$ or $I^-$, fluoro complexes of the type $BF_4^-$, $PF_6^-$, $SbF_6^-$ or $AsF_6^-$, anions of oxygen acids, alcoholates or acetylides or anions of cyclopentadiene.

The anions of oxygen acids can be, for example, the sulphate, phosphate, perchlorate, perbromate, periodate, antimonate, arsenate, nitrate, or carbonate ions, the anion of a $C_1$–$C_8$carboxylic acid, such as formate, acetate, propionate, butyrate, benzoate, phenylacetate, mono-, di- or trichloro- or -fluoroacetate, sulphonates, for example methyl-, ethyl-, propyl-, or n-butylsulphonate, trifluoromethylsulphonate (triflate), phenylsulphonate or benzylsulphonate and benzylsulphonate substituted by $C_1$–$C_4$alkyl, $C_1$–$C_4$alkoxy or halogen, especially fluoro, chloro or bromo, for example tosylate, mesylate, brosylate, p-methoxy- or p-ethoxyphenylsulphonate, pentafluorophenylsulphonate or 2,4,6-triisopropylsulphonate.

Particularly preferred anionic ligands $L_a$ and $L_b$ are $H^-$, $F^-$, $Cl^-$, $Br^-$, $BF_4^-$, $PF_6^-$, $SbF_6^-$, $AsF_6^-$, $CF_3SO_3^-$, $C_6H_5$—$SO_3^-$, 4-methyl-$C_6H_4$—$SO_3^-$, 3,5-dimethyl-$C_6H_3$—$SO_3^-$,2,4,6-trimethyl-$C_6H_2$—$SO_3^-$ and 4-$CF_3$—$C_6H_4$—$SO_3^-$ and also cyclopentadienyl ($Cp^-$). $Cl^-$ is especially preferred.

In the compounds of the formulae IIa and IIb up to three neutral ligands $L^1$, $L^2$ and $L^3$ are tertiary-substituted phosphine having 3- about 40, preferably 3–30, and, with particular preference, 3–18 carbon atoms. The tertiary-substituted phosphine is preferably a compound of the formula

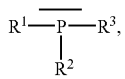

in which $R^1$, $R^2$ and $R^3$ independently of one another are $C_1$–$C_{20}$alkyl, $C_3$–$C_{12}$cycloalkyl, $C_2$–$C_{11}$heterocycloalkyl, $C_5$-$C_{12}$aryl, $C_1$–$C_{12}$heteroaryl or $C_6$–$C_{14}$aralkyl, which may be substituted by one or more substituents selected from the group consisting of $C_1$–$C_6$alkyl, $C_1$–$C_6$alkoxy, $C_1$–$C_6$haloalkyl, $C_5$–$C_{12}$aryl, —$NO_2$, $SO_3^-$, ammonium and halogen; the radicals $R^1$ and $R^2$ together are tetra- or pentamethylene, which may be substituted by one or more substituents selected from the group consisting of $C_1$–$C_6$alkyl, $C_1$–$C_6$haloalkyl, $NO_2$ and $C_1$–$C_6$alkoxy, or $R^1$ and $R^2$ represent tetra- or pentamethylene, which may be fused to 1 or 2 1,2-phenylene radicals, and wherein $R^3$ is as defined above.

Particular preferred are phosphines wherein $R^1$, $R^2$ and $R^3$ are methyl, ethyl, n- or i-propyl, n-, i-, s- or t-butyl, 1-, 2- or 3-pentyl, 1-, 2-, 3- or 4-hexyl, cyclopentyl, cyclohexyl, phenyl, naphthyl or benzyl, e.g. (i-$C_3H_7$)$_3$P, ($C_5H_9$)$_3$P and ($C_6H_{11}$)$_3$P.

In the compounds of the formulae IIa and IIb one or two of the neutral ligands $L^1$, $L^2$ and $L^3$ are monodentate, neutral $e^-$ donor ligands having electron donor properties, or two ligands together are bidentate, neutral $e^-$ donor ligands.

Such ligands are derived from heteroarenes, e.g. heteroarenes selected from the group consisting of furan, thiophene, pyrrole, pyridine, bis-pyridine, picolylimine, γ-pyran, γ-thiopyran, phenanthroline, pyrimidine, bis-pyrimidine, pyrazine, indole, coumarone, thionaphthene, carbazole, dibenzofuran, dibenzothiophene, pyrazole, imidazole, benzimidazole, oxazole, thiazole, bis-thiazole, isoxazole, isothiazole, quinoline, bis-quinoline, isoquinoline, bis-isoquinoline, acridine, chromene, phenazine, phenoxazine, phenothiazine, triazine, thianthrene, purine, bis-imidazole and bis-oxazole.

These ligands may further be substituted by suitable substituents selected from the group consisting of $C_1$–$C_6$alkyl, $C_1$–$C_6$alkoxy, carboxy, $C_1$–$C_6$alkoxycarbonyl, $C_1$–$C_6$haloalkyl, nitro, sulpho, ammonium and halogen.

Aryl and arylthio R is, for example phenyl or phenylthio or phenyl and phenylthio substituted by one or more substituents selected from the group consisting of $C_1$–$C_6$alkyl, $C_1$–$C_6$alkoxy, carboxy, $C_1$–$C_6$alkoxycarbonyl, $C_1$–$C_6$haloalkyl, nitro, sulpho, ammonium and halogen.

$C_3$–$C_5$alkenyl R is, for example, vinyl, 1-, 2- or 3-propenyl, or the different butenyl, pentenyl or hexenyl isomers, 1,3-hexadienyl or 2,4,6-heptatrienyl or is ethylidene, 1- or 2-propylidene or 1-, 2- or 3-propylidene directly attached to the carbene group. These substituents may be substituted with additional substituents selected from the group consisting of halogen, $C_1$–$C_5$alkoxy and phenyl, which in turn may be substituted with $C_1$–$C_5$alkyl, halogen, or $C_1$–$C_5$alkoxy.

The monomers and chain transfer agents can be present in an amount of from 0.01 to 99% by weight, preferably from 0.1 to 95% by weight, with particular preference from 1 to 90% by weight and, with especial preference, from 5 to 80% by weight, based on the monomers present in the composition.

The composition may comprise inert solvents. One particular advantage is that in the case of liquid monomers metathesis polymerisation can be carried out without the use of a solvent. A further advantage is that the polymerisation can even be carried out in water, polar and protic solvents or water/solvent mixtures.

Examples of suitable inert solvents are protic polar and aprotic solvents, which can be used alone or in mixtures of at least two solvents. Examples are ethers (dibutyl ether, tetrahydrofuran, dioxane, ethylene glycol monomethyl or dimethyl ether, ethylene glycol monoethyl or diethyl ether, diethylene glycol diethyl ether, triethylene glycol dimethyl ether), halogenated hydrocarbons, etc.

In the context of the present invention, catalytic amounts denote preferably an amount from 0.001 to 1.0 mol-%, with particular preference from 0.01 to 0.5 mol-% and, with very particular preference, from 0.01 to 0.1 mol-%, based on the amount of monomer.

A particularly preferred embodiment of the invention relates to a polymerisable composition comprising
  a) a catalytically effective amount of a penta- or hexavalent ruthenium carbene catalyst selected from the group consisting of

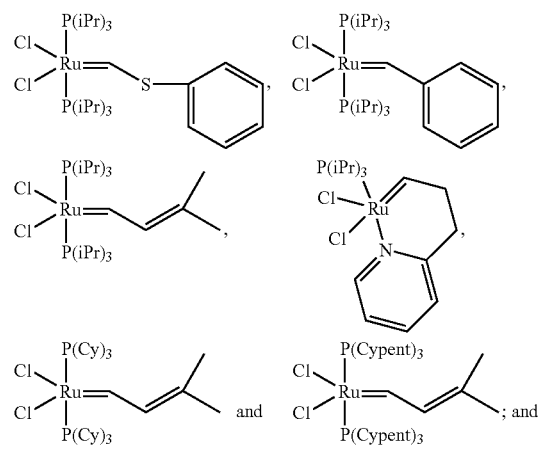

b) the chain transfer agent A—B and monomers capable of forming the compound (I), wherein A, B, X, X', Y, Y', Z, Z', Z'', p, q, m and n are as defined above.

Another embodiment of the invention relates to a composition comprising
  α) a polymer obtainable from ethylenically unsaturated polymerisable monomers or oligomers;
  β) the compound (I) wherein A, B, X, X', Y, Y', Z, Z', Z'', p, q, m and n are as defined above.

Suitable polymers present as component α) in the composition are obtained by conventional methods of polymerisation from monomers or oligomers are selected from the group consisting of monomeric or oligomeric alkenes, styrenes, conjugated dienes, acrolein, vinyl acetate, vinyl pyrrolidone, vinyl imidazole, maleic acid anhydride, acrylic acid, $C_1$–$C_4$alkyl acrylic acid or amides, nitriles, anhydrides and salts of acrylic acid and $C_1$–$C_4$alkyl acrylic acid, acrylic acid $C_1$–$C_{24}$alkyl esters, $C_1$–$C_4$alkyl acrylic acid $C_1$–$C_{24}$alkyl esters, vinyl halides and vinylidene halides.

A preferred embodiment of the invention relates to compositions wherein polyolefins are present as component α).

Suitable polyolefins are polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

These polyolefins are obtainable by known methods, such as radical polymerisation (normally under high pressure and at elevated temperature) or catalytic polymerisation using a catalyst that normally contains one or more than one metal of groups IVb, Vb, VIb or VIII of the Periodic Table. These metals usually have one or more than one ligand, typically oxides, or halide, alcoholate, ester, ether, amine, alkyl, alkenyl and/or aryl groups that may be either p- or s-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used in the optional presence of further activators, such as metal alkyl, metal hydride, metal alkyl halide, metal alkyl oxide or metal alkyloxane groups, said metals being elements of groups Ia, IIa and/or IIIa of the Periodic Table. The activators may be modified conveniently with further ester, ether, and amine or silyl ether groups. These catalyst systems are usually termed Phillips, Standard Oil Indiana, Ziegler (-Natta), TNZ (DuPont), metallocene or single site catalysts (SSC).

Other polyolefins present in the composition defined above are

Mixtures of the polymers mentioned above, for example mixtures of polypropylene with polyisobutylene, polypropylene with polyethylene, for example PP/HDPE, PP/LDPE, and mixtures of different types of polyethylene, for example LDPE/HDPE;

Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene, such as hexadiene, dicyclopentadiene or ethylidene-norbornene; and mixtures of such copolymers with one another and with polymers mentioned above, for example polypropylene/ethylene-propylene copolymers, LDPE/ethylene vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

Particularly preferred are polyethylene, polyethylene blends, polypropylene, propylene copolymers and polypropylene blends.

Polyethylene present in the composition is preferred having a melt index or melt flow value, in the range of about 0.01 to about 20 g/10 min., as measured by ASTM-D-1238, condition E, and a density in the range of about 0.9 to about 0.96 g/cm$^3$. This includes the branched polymers made at high pressure with a free-radical initiator and those made at low, medium, or high pressure using a coordination catalyst, which gives linear (i.e. substantially non-branched) polymers. Those made using a free-radical initiator (e.g. peroxo compounds) have become known in the art as "low density polyethylene" (LDPE) and those made using a coordination catalyst (e.g. a "Ziegler-type catalyst) have become known as "high density polyethylene" (HDPE).

Also preferred are commercially available "linear low density polyethylenes" (LLDPE) which are prepared using a coordination catalyst, but which, because of the presence of minor amounts of copolymerised higher olefins (especially olefins of 4–10 carbon atoms), have a density lower than HDPE, yet the arrangement of polymerised molecular units is of the linear type.

Particularly preferred are polyethylene types of the LLDPE variety, especially those which have a melt flow value in the range of about 0.1–10 and sufficient comonomer units to give a density in the range of about 0.9 to about 0.935 g/cm$^3$, such comonomer units being an aliphatic hydrocarbon olefin of from 4 to 8 carbon atoms, including isomers in that range. These LLDPE polymers are recognized in the art as having excellent strength, resistance to tear propagation as shown by Dart Impact and Elmendorf Tear, and exhibit good resistance to tearing or puncturing when stressed against articles having protuberances. This preference for the LLDPE variety is especially important in food packaging applications and most especially in packaging of red meat.

The composition of the invention can comprise additives suitable for polymers, which additives are preferably used as formulating auxiliaries to improve together with the compounds of the formula (I) the chemical and physical properties of the polymers containing these additives. The auxiliaries can be present in high proportions, for example, in amounts of up to 70% by weight, preferably from 1 to 70% by weight, more preferably from 5 to 60% by weight, with particular preference from 10 to 50% by weight and with especial preference from 10 to 40% by weight, based on the composition. Such auxiliaries have been disclosed in large numbers and are set out by way of example in the following list of auxiliaries: antioxidants selected from the group consisting of alkylated monophenols, alkylthiomethylphenols, hydroquinones and alkylated hydroquinones, tocopherols, hydroxylated thiodiphenyl ethers, alkylidene-bisphenols, O-, N- and S-benzyl compounds, hydroxybenzylated malonates, aromatic hydroxybenzyl compounds, triazine compounds, benzylphosphonates, acylaminophenols, esters and amides of β-(3,5-di-t-butyl-4- hydroxyphenyl)propionic acid, β-(3,5-di-t-butyl-4-hydroxy-3-methylphenyl)propionic acid, or β-(3,5-dicyclohexyl-4-hydroxyphenyl)propionic acid, ascorbic acid, aminic antioxidants, light stabilisers, phosphites, phosphines, phosponites, hydroxylamines, nitrones, thiosynergists, peroxide scavengers, polyamide stabilisers, basic co-stabilisers, nucleating agents, fillers and reinforcing agents, plasticisers, lubricants, emulsifiers, pigments, Theological additives, levelling assistants, optical brighteners, flame proofing agents, antistatic agents, blowing agents, benzofuranones and indolinones.

Such auxiliaries have been disclosed in large numbers and are set out by way of example in the following list of auxiliaries:

1. Antioxidants 1.1. Alkylated mononhenols, for example 2,6-di-t-butyl-4-methylphenol, 2-butyl-4,6-dimethylphenol, 2,6-di-t-butyl-4-ethylphenol, 2,6-di-t-butyl-4-n-butylphenol, 2,6-di-t-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-t-butyl-4-methoxymethylphenol, linear or side chain-branched nonylphenols; such as 2,6-dinonyl-4-methylphenol, 2,4-dimethyl-6-(1-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-t-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-t-butyl-4-methoxyphenol, 2,5-di-t-butylhydroquinone, 2,5-di-t-amylhydroquinone, 2,6-diphenyl-4-octadecyloxyphenol, 2,6-di-t-butylhydroquinone, 2,5-di-t-butyl-4-hydroxyanisole, 3,5-di-t-butyl-4-hydroxyanisole, 3,5-di-t-butyl-4-hydroxyphenyl stearate, bis(3,5-di-t-butyl-4-hydroxyphenyl)adipate.

1.4. Tocopherols, for example α-, β-, γ- or δ-tocopherols and mixtures thereof (vitamin E).

1.5. Hydroxylated thiodiphenyl ethers, for example 2,2'-thiobis(6-t-butyl-4-methylphenol), 2,2'-thiobis(4-octylphenol), 4,4'-thiobis(6-t-butyl-3-methylphenol), 4,4'-thiobis(6-t-butyl-2-methylphenol), 4,4'-thiobis(3,6-di-sec-amylphenol), 4,4'-bis(2,6-dimethyl-4-hydroxyphenyl)disulphide.

1.6. Alkylidene-bis-phenols, for example 2,2'-methylene-bis(6-t-butyl-4-methylphenol), 2,2'-methylene-bis(6-t-butyl-4-ethylphenol), 2,2'-methylene-bis[4-methyl-6-(α-methylcyclohexyl)phenoyl], 2,2'-methylene-bis(4-methyl-6-cyclohexylphenol), 2,2'-methylene-bis(6-nonyl-4-methylphenol), 2,2'-methylene-bis(4,6-di-t-butylphenol), 2,2'-ethylidene-bis(4,6-di-t-butylphenol), 2,2'-ethylidene-bis(6-t-butyl-4-isobutylphenol), 2,2'-methylene-bis[6-(α-methylbenzyl)-4-nonylphenol], 2,2'-methylene-bis[6-(α-dimethylbenzyl)-4-nonylphenol], 4,4'-methylene-bis(2,6-di-t-butylphenol), 4,4'-methylene-bis(6-t-butyl-2-methylphenol), 1,1-bis(5-t-butyl-4-hydroxy-2-methylphenyl)butane, 2,6-bis(3-t-butyl-5-methyl-2-hydroxybenzyl)-4-methylphenol, 1,1,3-tris(5-t-butyl-4-hydroxy-2-methylphenyl)butane, 1,1-bis(5-t-butyl-4-hydroxy-2-methylphenyl)-3-n-dodecylmercaptobutane, ethylene glycol bis[3,3-bis(3'-t-butyl-4'-hydroxyphenyl) butyrate], bis(3-t-butyl-4-hydroxy-5-methylphenyl)dicyclopentadiene, bis[2-(3'-t-butyl-2'-hydroxy-5'-methylbenzyl)-6-t-butyl-4-methylphenyl]terephthalate, 1,1-bis(3,5-dimethyl-2-hydroxyphenyl)butane, 2,2-bis(3,5-di-t-butyl-4-hydroxyphenyl)propane, 2,2-bis(5-t-butyl-4-hydroxy-2-methylphenyl)-4-n-dodecylmercaptobutane, 1,1,5,5-tetra-(5-t-butyl-4-hydroxy-2-methylphenyl)pentane.

1.7. O-, N- and S-benzyl compounds, for example 3,5,3',5'-tetra-t-butyl-4,4'-dihydroxydibenzyl ether, octadecyl 4-hydroxy-3,5-dimethylbenzylmercaptoacetate, tridecyl 4-hydroxy-3,5-di-t-butylbenzylmercaptoacetate, tris(3,5-di-t-butyl-4-hydroxybenzyl)-amine, bis(4-t-butyl-3-hydroxy-2,6-dimethylbenzyl)dithioterephthalate, bis(3,5-di-t-butyl-4-hydroxybenzyl)sulphide, isooctyl 3,5-di-t-butyl-4-hydroxybenzylmercaptoacetate.

1.8. Hydroxybenzylated malonates, for example dioctadecyl 2,2-bis(3,5-di-t-butyl-2-hydroxybenzyl)malonate, dioctadecyl 2-(3-t-butyl-4-hydroxy-5-methylbenzyl)malonate, didodecyl mercaptoethyl-2,2-bis(3,5-di-t-butyl-4-hydroxybenzyl)malonate, di-[4-(1,1,3,3-tetramethylbutyl)phenyl]-2,2-bis(3,5-di-t-butyl-4-hydroxybenzyl)malonate.

1.9. Aromatic hydroxybenzyl compounds, for example 1,3,5-tris(3,5-di-t-butyl-4-hydroxybenzyl)-2,4,6-trimethylbenzene, 1,4-bis(3,5-di-t-butyl-4-hydroxybenzyl)-2,3,5,6-tetramethylbenzene, 2,4,6-tris(3,5-di-t-butyl-4-hydroxybenzyl)phenol.

1.10. Triazine compounds, for example 2,4-bisoctylmercapto-6-(3,5-di-t-butyl-4-hydroxyanilino)-1,3,5-triazine, 2-octylmercapto-4,6-bis(3,5-di-t-butyl-4-hydroxyanilino)-1,3,5-triazine, 2-octylmercapto-4,6-bis(3,5-di-t-butyl-4-hydroxyphenoxy)-1,3,5-triazine, 2,4,6-tris(3,5-di-t-butyl-4-hydroxyphenoxy)-1,2,3-triazine, 1,3,5-tris(3,5-di-t-butyl-4-hydroxybenzyl)isocyanurate, 1,3,5-tris(4-t-butyl-3-hydroxy-2,6-dimethylbenzyl)isocyanurate, 2,4,6-tris(3,5-di-t-butyl-4-hydroxyphenylethyl)-1,3,5-triazine, 1,3,5-tris(3,5-di-t-butyl-4-hydroxyphenylpropionyl) hexahydro-1,3,5-triazine, 1,3,5-tris(3,5-dicyclohexyl-4-hydroxybenzyl)isocyanurate.

1.11. Benzylphosphonates, for example dimethyl 2,5-di-t-butyl-4-hydroxybenzyl-phosphonate, diethyl 3,5-di-t-butyl-4-hydroxybenzylphosphonate, dioctadecyl 3,5-di-t-butyl-4-hydroxybenzylphosphonate, dioctadecyl 5-t-butyl-4-hydroxy-3-methylbenzylphosphonate, the calcium salt of the monoethyl ester of 3,5-di-t-butyl-4-hydroxybenzylphosphonic acid.

1.12. Acylaminophenols, for example 4-hydroxylauranilide, 4-hydroxystearanilide, octyl N-(3,5-di-t-butyl-4-hydroxyphenyl)carbamate.

1.13. Esters of β-(3,5-di-t-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (2-hydroxyethyl)isocyanurate, N,N'-bis(2-hydroxyethyl) oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-t-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(2-hydroxyethyl)isocyanurate, N,N'-bis(2-hydroxyethyl) oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(2-hydroxyethyl) isocyanurate, N,N'-bis(2-hydroxyethyl)-oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-t-butyl-4-hydroxyphenylacetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(2-hydroxyethyl)isocyanurate, N,N'-bis(2-hydroxyethyl)-oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3.5-di-t-butyl-4-hydroxyphenyl)propionic acid, e.g. N,N'-bis(3,5-di-t-butyl-4-hydroxyphenylpropionyl)hexamethylenediamide, N,N'-bis(3,5-di-t-butyl-4-hydroxyphenylpropionyl)trimethylenediamide, N,N'-bis(3,5-di-t-butyl-4-hydroxyphenylpropionyl)hydrazide, N,N'-bis[2-(3-[3,5-di-t-butyl-4-hydroxyphenyl]propionyloxy)ethyl]oxamide (Naugard® XL-1 from Uniroyal).

1.18. Ascorbic acid (vitamin C).

1.19. Aminic antioxidants, for example N,N'-diisopropyl-p-phenylenediamine, N,N'-di-sec-butyl-p-phenylenediamine, N,N'-bis(1,4-dimethyl-pentyl)-p-phenylenediamine, N,N'-bis(1-ethyl-3-methyl-pentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-di-(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulphonamido)-diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-t-octylphenyl)-1-naphthylamine, N-phenyl-2-naphthylamine, octylated diphenylamine, for example p,p'-di-t-octyldiphenylamine, 4-n-butylaminophenol, 4-butyrylaminophenol, 4-nonanoylaminophenol, 4-dodecanoylaminophenol, 4-octadecanoylaminophenol, di-(4-methoxyphenyl) amine, 2,6-di-t-butyl-4-dimethylaminomethylphenol, 2,4'-diaminodiphenylmethane, 4,4'-diaminodiphenylmethane, N,N,N',N'-tetramethyl-4,4'-diamino-diphenylmethane, 1,2-di[(2-methylphenyl)amino]ethane, 1,2-diphenylaminopropane, (otolyl)biguanide, di-[4-(1',3'-dimethylbutyl)phenyl]amine, t-octylated N-phenyl-1-naphthylamine, a mixture of mono- and dialkylated t-butyl/t-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, mixtures of mono- and dialkylated t-butyldiphenylamines, 2,3-dihydro-3,3-dimethyl-4H-1,4-benzothiazine, phenothiazine, a mixture of mono- and dialkylated t-butyl/t-octyl-phenothiazines, a mixture of mono- and dialkylated t-octyl-phenothiazines, N-allylphenothiazine, N,N, N', N'-tetraphenyl-1,4-diaminobut-2-ene, N,N-bis(2,2,6,6-tetramethylpiperidin-4-yl)hexamethylenediamine, bis(2, 2,6,6-tetramethylpiperidin-4-yl)sebacate, 2,2,6,6-tetramethylpiperidin-4-one and 2,2,6,6-tetramethylpiperidin-4-ol.

2. Other UV-absorbers and Light Stabilisers 2.1. Acrylates, for example ethyl α-cyano-β,β-diphenyl acrylate or isooctyl α-cyano-β,β-diphenyl acrylate, methyl α-carbomethoxycinnamate, methyl α-cyano-β-methyl-p-methoxycinnamate or butyl α-cyano-β-methyl-p-methoxycinnamate, methyl α-carbomethoxy-p-methoxycinnamate and N-(β-carbomethoxy-β-cyanovinyl)-2-methylindoline.

2.2. Nickel compounds, for example nickel complexes of 2,2'-thio-bis[4-(1,1,3,3-tetramethylbutyl)phenol], such as the 1:1- or 1:2-complex, with or without additional ligands, such as n-butylamine, triethanolamine or N-cyclohexyldiethanolamine, nickel dibutyldithiocarbamate, nickel salts of monoalkyl esters, such as of the methyl or ethyl ester, of 4-hydroxy-3,5-di-t-butylbenzylphosphonic acid, nickel complexes of ketoximes, e.g. of 2-hydroxy-4-methylphenyl undecyl ketoxime, nickel complexes of 1-phenyl-4-lauroyl-5-hydroxypyrazole, with or without additional ligands.

2.3. Sterically hindered amines, for example bis(2,2,6,6-tetramethylpiperidin-4-yl)sebacate, bis(2,2,6,6-tetramethylpiperidin-4-yl) succinate, bis(1,2,2,6,6-pentamethylpiperidin-4-yl) sebacate, bis(1-octyloxy-2,2,6,6-tetramethylpiperidin-4-yl)sebacate, bis(1,2,2,6,6-pentamethylpiperidyl)n-butyl-3,5-di-t-butyl-4-hydroxybenzylmalonate, the condensate of 1-hydroxyethyl-2,2,6,6-tetramethyl-4-hydroxypiperidine and succinic acid, the linear or cyclic condensates of N,N'-bis(2,2,6,6-tetramethyl-4-piperidyl)hexamethylenediamine and 4-t-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl) 1,2,3,4-butanetetraoate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-t-butylbenzyl)malonate, 3-n-octyl-7,7,9,9-tetramethyl-1,3, 8-triazaspiro-[4.5]decane-2,4-dione, bis(1-octyloxy-2,2, 6,6-tetramethylpiperidyl)sebacate, bis(1-octyloxy-2,2,6, 6-tetramethylpiperidyl)succinate, the linear or cyclic condensates of N,N'-bis(2,2,6,6-tetramethyl-4-piperidyl) hexamethylenediamine and 4-morpholino-2,6-dichloro-1, 3,5-triazine, the condensate of 2-chloro-4,6-di(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1, 3,8-triazaspiro[4.5]decane-2,4-dione, 3-dodecyl-1-(2,2,6, 6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, the condensate of N,N'-bis(2,2,6,6-tetramethyl-4-piperidyl)-hexamethylenediamine and 4-cyclohexylamino-2,6-dichloro-1, 3,5-triazine, the condensate of 1,2-bis(3-aminopropylamino)ethane and 2,4,6-trichloro-1,3,5-triazine and also 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza- 4-oxospiro[4.5]decane, the reaction product of 7,7,9,9-tetramethyl-2-cycloundecyl-1-oxa-3,8-diaza-4-oxospiro[4.5]decane and epichlorohydrine, 1,1-bis(1,2,2,6,6-pentamethyl-4-piperidyloxycarbonyl)-2-(4-methoxyphenyl)ether, N,N'-bis-formyl-N,N'-bis(2,2,6,6-tetramethyl-4-piperidyl)-hexamethylenediamine, the diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, the reaction product of maleic anhydride-α-olefin copolymer and 2,2,6,6-tetramethyl-4-aminopiperidine or 1,2,2,6,6-pentamethyl-4-amino-piperidine.

2.4. Oxalamides, for example 4,4'-dioctyloxyoxanilide, 2,2'-diethoxy-oxanilide, 2,2'-dioctyloxy-5,5'-di-t-butyloxanilide, 2,2'-didodecyloxy-5,5'-di-t-butyloxanilide, 2-ethoxy-2'-ethyloxanilide, N,N'-bis(3-dimethylaminopropyl)oxalamide, 2-ethoxy-5-t-butyl-2'-ethyloxanilide and its mixture with 2-ethoxy-2'-ethyl-5,4'-di-t-butyloxanilide and mixtures of o- and p-methoxy- and of o- and p-ethoxy-disubstituted oxanilides.

2.5. 2-(2-Hydroxaphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6bis(4-methylphenyl)-1,3,5-triazine, 2-(2-hydroxy-4-dodecyloxyphenyl)-4,6-bis(2,4-dimethylphenyl-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)-phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example, N,N'-diphenyloxalamide, N-salicylal-N'-salicyloyl hydrazine, N,N'-bis(salicyloyl)hydrazine, N,N'-bis(3,5-di-t-butyl-4-hydroxyphenyl-propionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites, phosphines and phosphonites, for example triphenyl phosphite, diphenyl alkyl phosphites, phenyl dialkyl phosphites, tris(nonylphenyl)phosphite, trilauryl phosphite, trioctadecyl phosphite, trimethylphosphine, tri-n-butylphosphine, triphenylphosphine, distearyl pentaerythritol diphosphite, tris(2,4-di-t-butylphenyl)phosphite, diisodecyl pentaerythritol diphosphite, bis(2,4-di-t-butylphenyl)pentaerythritol diphosphite, bis(2,6-di-t-butyl-4-methylphenyl)pentaerythritol diphosphite, bisisodecyloxypentaerythritol diphosphite, bis(2,4-di-t-butyl-6-methylphenyl)pentaerythritol diphosphite, bis(2,4,6-tri-t-butylphenyl)pentaerythritol diphosphite, tristearyl sorbitol triphosphite, tetrakis(2,4-di-t-butylphenyl) 4,4'-biphenylene diphosphonite, 6-isooctyloxy-2,4,8,10-tetra-t-butyl-12H-dibenzo[d,g]-1,3,2-dioxaphosphocin, 6-fluoro-2,4,8,10-tetra-t-butyl-12-methyl-dibenzo[d,g]-1,3,2-dioxaphosphocin, bis(2,4-di-t-butyl-6-methylphenyl)methyl phosphite, bis(2,4-di-t-butyl-6-methylphenyl)ethyl phosphite, 2,2',2"-nitrilo[triethyl-tris(3,3',5,5"tetra-t-butyl-1,1'-biphenyl-2,2'-diyl)phosphite], 2-ethylhexyl (3,3',5,5'-tetra-t-butyl-1,1'-biphenyl-2,2'-diyl)phosphite.

Particular preference is given to using the following phosphites: tris(2,4-Di-t-butylphenyl)phosphite (Irgafos® 168, Ciba Specialty Chemicals), tris(nonylphenyl) phosphite and the phosphites selected from the group comprising the structural formulae (a), (b), (c), (d), (e), (f) and (g) given below:

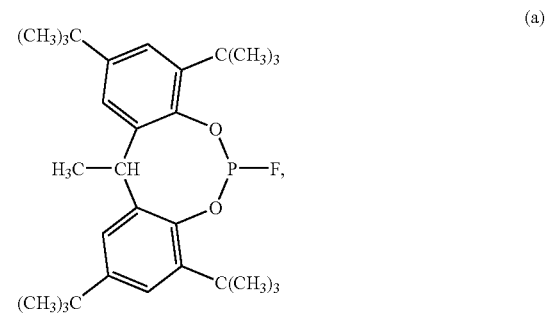
(a)

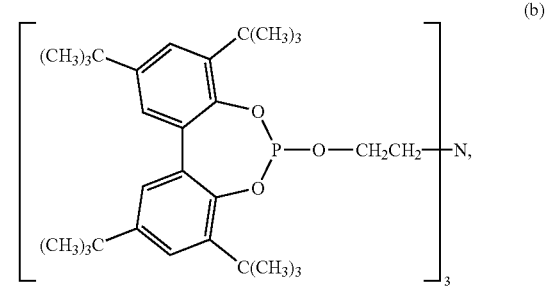
(b)

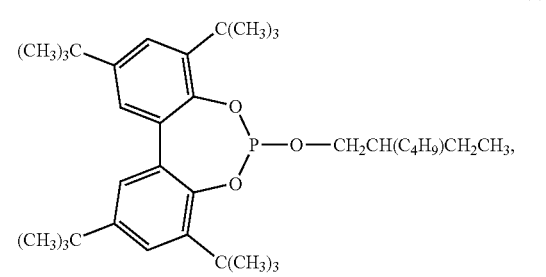
(c)

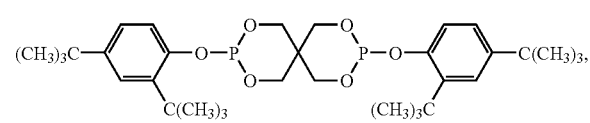
(d)

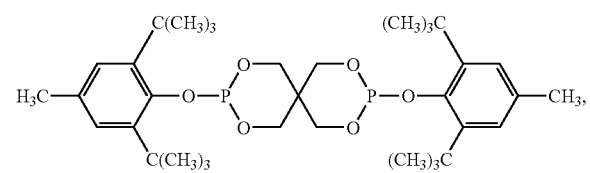
(e)

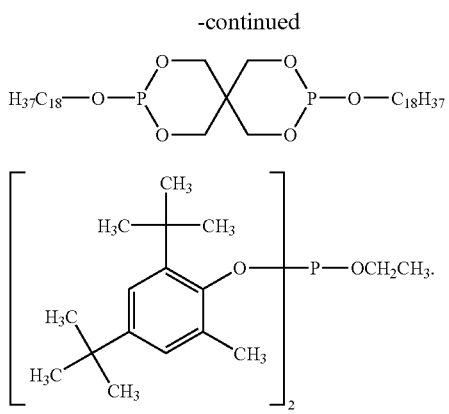

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine N-heptadecyl-N-octadecylhydroxylamine, N,N-dialkylhydroxylamine from hydrogenated tallow fatty amines.

6. Nitrones, for example N-benzyl α-phenyl nitrone, N-ethyl α-methyl nitrone, N-octyl α-heptyl nitrone, N-lauryl α-undecyl nitrone, N-tetradecyl α-tridecyl nitrone, N-hexadecyl α-pentadecyl nitrone, N-octadecyl α-heptadecyl nitrone, N-hexadecyl α-heptadecyl nitrone, N-octadecyl α-pentadecyl nitrone, N-heptadecyl α-heptadecyl nitrone, N-octadecyl α-hexadecyl-nitrone, and nitrones derived from N,N-dialkylhydroxylamines prepared from hydrogenated tallow fatty amines.

7. Thiosynergists, for example dilauryl thiodiproprionate or distearyl thiodipropionate.

8. Peroxide scavengers, for example esters of β-thiodipropionic acid, for example the lauryl, stearyl, myristyl or tridecyl esters, mercaptobenzimidazole, the zinc salt of 2-mercaptobenzimidazole, zinc dibutyldithiocarbamate, dioctadecyl disulphide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate, potassium palmitate, antimony pyrocatecholate or zinc pyrocatecholate.

11. Nucleating agents, for example inorganic substances, such as talc, metal oxides, such as titanium dioxide or magnesium oxide, phosphates, carbonates or sulphates of, preferably, alkaline earth metals; organic compounds, such as mono- or polycarboxylic acids and their salts, such as 4-t-butylbenzoic acid, adipic acid, diphenyl acetic acid, sodium succinate or sodium benzoate; and polymeric compounds, for example ionic copolymers (ionomers).

12. Fillers and reinforcing agents, for example calcium carbonate, silicates, glass fibres, glass beads, talc, kaolin, mica, barium sulphate, metal oxides and hydroxides, carbon black, graphite, wood flour and flours or fibres of other natural products, and synthetic fibres.

13. Benzofuranones and indolinones, as described, for example, in U.S. Pat. Nos. 4,325,863; 4,338,244; 5,175,312, 5,216,052; 5,252,643; DE-A-4 316 611; DE-A-4 316 622; DE-A-4 316 876; EP-A-0 589 839 or EP-A-0 591 102, or 3-[4-(2-acetoxyethoxy)phenyl]-5,7-di-t-butylbenzofuran-2-one, 5,7-di-t-butyl-3-[4-(2-stearoyloxyethoxy)-phenyl]benzofuran-2-one, 3,3'-bis[5,7-di-t-butyl-3-(4-[2-hydroxyethoxy]phenyl)benzofuran-2-one], 5,7-di-t-butyl-3-(4-ethoxyphenyl)benzofuran-2-one, 3-(4-acetoxy-3,5-dimethylphenyl)-5,7-di-t-butylbenzofuran-2-one, 3-(3,5-dimethyl-4-pivaloyloxyphenyl)-5,7-di-t-butylbenzofuran-2-one, 3-(3,4-dimethylphenyl)-5,7-di-t-butylbenzofuran-2-one, 3-(2,3-dimethylphenyl)-5,7-di-t-butylbenzofuran-2-one.

14. Other additives, for example plasticisers, lubricants, emulsifiers, pigments, rheological additives, catalysts, levelling assistants, optical brighteners, flame proofing agents, antistatic agents or blowing agents.

The mixing of the components of the composition, the polymer obtainable from ethylenically unsaturated polymerisable monomers or oligomers, component α), with the compound (I), component β), is carried out by known methods, e.g. by commonly used techniques, such as roll-milling, mixing in a Banbury type mixer, or mixing in an extruder barrel and the like.

Conveniently, the compound (I) acting as the antifog agent can also be added substantially simultaneously or sequentially with any other additives (colorants, tackifiers, slip agents, block agents, and the like), which may be desired in certain instances. The compound (I) may also be preblended with other additives followed by adding the blend to the polymer. For easier batch-to-batch control of quality, it may be preferred to employ concentrated master batches of polymer/agent blends, which are subsequently blended, as portions, to additional quantities of polymer to achieve the final desired formulation.

It is well known in the art that polybutene or polyisobutylene is an effective tackifier or cling agent when mixed in polyethylene. The polybutenes or polyisobutylenes usually employed for this purpose are generally used in small quantities. The use of such tackifiers is preferred in certain of the formulations contemplated as being within the purview of the present invention, especially in meat packaging (and the like) where it is desired that substantially no liquid leaks occur during the packaging operation until heat-sealed, or during shipping, storage, and handling after being heat-sealed.

The process for the production of films of polyolefins is well-known and includes the techniques of casting films as thin sheets through narrow slit dies, and the blown-film technique wherein an extruded tube of molten polymer is inflated to the desired "bubble" diameter and/or film thickness before being cooled and collected or further processed. These present formulations are also suitable in coextrusion fabrication of films wherein two or more films comprise a multi-layer structure. The compound (I) can exude through an adjacent film layer, which does not contain the compound (I), thereby rendering the adjacent layer resistant to fogging.

The polymer films of this invention with antifog properties are advantageously used for greenhouse films. Therefore, the invention also comprises the method for increasing the antifog properties of polymers, which comprises incorporating within the film polymer material a compound (I).

The polymer films of this invention are also advantageously used for films used for food packaging applications. Therefore the invention also comprises the method for incorporating within film material for food packaging the compound (I).

The following examples illustrate the invention without limiting its scope.

EXAMPLE 1

Oligomers with monovalent chain transfer agents:

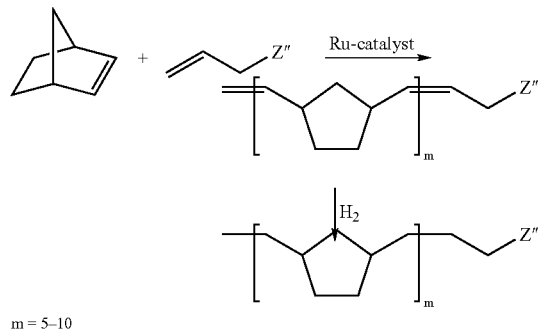

m = 5–10

150 ml toluene are given to a 500 ml round bottomed flask, equipped with a thermometer, mechanical stirrer, condenser, dropping funnel and nitrogen inlet and a nitrogen atmosphere is provided. The catalyst bis(tricyclopentylphosphine)dichloro(3-methyl-2-butenylidene)ruthenium (APT Cat ASMC 716) and chain transfer agent are added at room temperature under nitrogen. 50 g (0.53 mol) 2-norbornene, dissolved in 350 ml toluene, are dropped during 1 hour into the flask at 38–45° C. To complete the reaction, the reaction mixture is kept at 40° C. for 6 hours (cf. Table 1, compounds 1.1–1.4).

The reaction mixture is poured without purification to an autoclave. After rinsing with nitrogen the reaction mixture is hydrogenated at 100° C. and 30 bar for 8 hours. After cooling to room temperature the reaction mixture is filtered through a Celite® panel on a Buchner filter and concentrated in the vacuum, which yields the desired product (cf. Table 2, Compounds 2.1–2.4).

TABLE 1

| Compound No. | Cat./Monomer [mol/mol] | Chain transfer agent (CTA) | Monomer/CTA [mol/mol] | $M_n$ | $M_w$ | $M_w/M_n$ |
|---|---|---|---|---|---|---|
| 1.1 | 1/1000 | ⟶[O⁀]₇O⟶ | 1/0.20 | 1433 | 1940 | 1.35 |
| 1.2 | 1/1000 | ⟶[O⁀]₇O⟶ | 1/0.125 | 2034 | 2070 | 1.33 |
| 1.3 | 1/1000 | ⟶[O⁀]₃O⟶ | 1/0.10 | 2051 | 3540 | 1.73 |
| 1.4 | 1/1000 | allyl-O-CH₂-(2,2-dimethyl-1,3-dioxolan-4-yl) | 1/0.20 | 1043 | 1418 | 1.36 |

TABLE 2

| Compound No. | Chain transfer agent (CTA) | $M_n$ | $M_w$ | $M_w/M_n$ | Yield[1] |
|---|---|---|---|---|---|
| 2.1 | ⟶[O⁀]₇O⟶ | 1350 | 1862 | 1.38 | 90% |
| 2.2 | ⟶[O⁀]₇O⟶ | 1920 | 2385 | 1.24 | 97% |
| 2.3 | ⟶[O⁀]₃O⟶ | 1452 | 1900 | 1.30 | 96% |

TABLE 2-continued

| Compound No. | Chain transfer agent (CTA) | $M_n$ | $M_w$ | $M_w/M_n$ | Yield[1] |
|---|---|---|---|---|---|
| 2.4 | 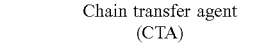 | 1076 | 1298 | 1.21 | 70% |

[1] based on the monomer used

EXAMPLE 2

Oligomers with monovalent (hydrophilic) chain transfer agents:

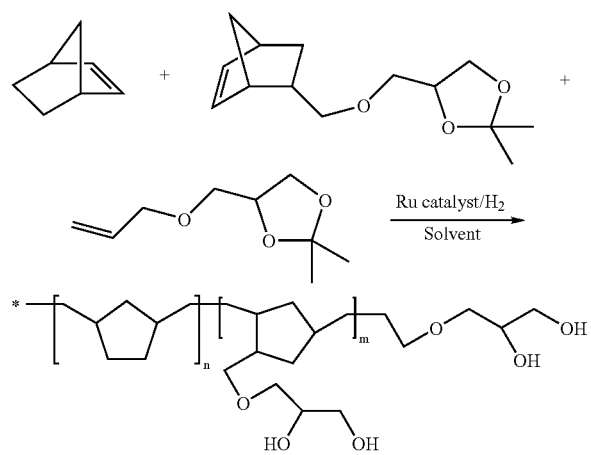

a) To a 50 ml round bottomed flask, equipped with mechanical stirrer, condenser, thermometer, nitrogen inlet and dropping funnel, 2.59 g of allyl Solketal®, 5 ml of toluene as solvent and 0.128 g bis(tricyclopentylphosphine)dichloro(3-methyl-2-butenylidene)ruthenium (APT Cat ASMC 716) are added at room temperature. A solution of 8.47 g 2-norbornene and 21.53 g 2,2-dimethyl-4-(bicyclo[2.1.1]hepten-(5)-yl-(2)-methoxymethyl)-1,3-dioxolane (90%, preparation described below) are dropped into the flask and the temperature is maintained for 30 min. at 35–40° C. The temperature of the reaction mixture is then maintained for 8 hours at 50° C. under stirring.

The reaction mixture is then transferred into a 500 ml autoclave containing 100 ml toluene. After rinsing the autoclave with nitrogen the reaction mixture is hydrogenated for 18 hours at 100° C. under 40 bars of hydrogen pressure. The cooled reaction mass is filtered through a cake of Tonsil® 414 FF as filter aid in a Buchner funnel. The solvent is distilled off under vacuum and 30 g of a pale, grey wax are obtained. To liberate the free hydroxy groups the product is dissolved in 200 ml of THF. 1 g of 6 N HCl solution and 3 g of water are added, and the solution is left at room temperature overnight. The solution is filtered after treatment with active charcoal, and the solvent is distilled off under vacuum. 26 g of a light grey wax are obtained. Softening range: 110–120° C.; GPC: $M_n$: 1966, $M_w$: 3295, $M_w/M_n$: 1.68.

b) The starting material is prepared as follows:

Preparation of 2,2-dimethyl-4-(bicyclo[2.1.1]hepten-(5)-yl-(2)-methoxymethyl)-1,3-dioxolane as chain transfer agent (CTA)

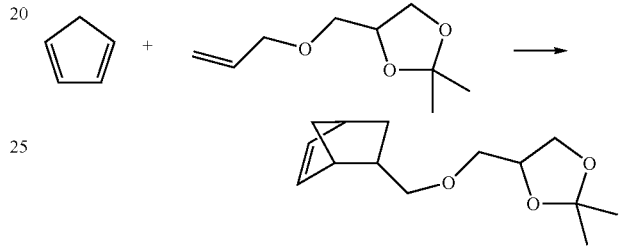

To a 500 ml autoclave, 40 g of dicyclopentadiene and 130.3 g of allyl Solketal® are given at room temperature. After rinsing with nitrogen the mass is heated and maintained for 16 hours at 150° C. After cooling to room temperature the reaction mass is distilled under vacuum in a Claisen equipment and 2 fractions are collected. The second fraction (2 mm Hg, 100–120° C.) contains 76 g of approximately 90% (GC) of the desired product.

EXAMPLE 3

Oligomers with bivalent chain transfer agents

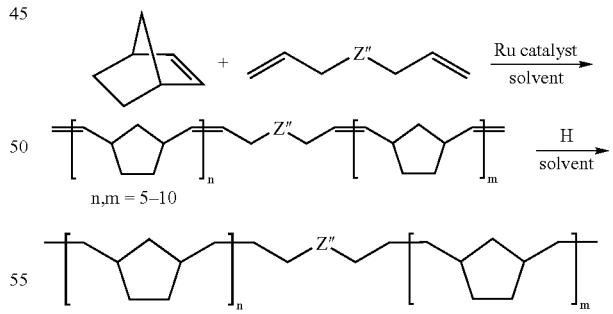

a) In a 250 ml round bottomed flask, equipped with mechanical stirrer, condenser, thermometer, nitrogen inlet and dropping funnel, 12.7 g of diallyl PEG 400 (preparation described below), 90 ml of toluene as solvent and 0.228 g bis(tricyclopentylphosphine)dichloro(3-methyl-2-butenylidene)ruthenium (APT Cat ASMC 716) as catalyst are added at room temperature. A degassed solution of 30 g of 2-norbornene in 30 ml of toluene is slowly added within one hour via the dropping funnel. The temperature is kept under 40° C. After the addition of the 2-norbornene solutions the temperature of the reaction mixture is maintained for 16 hours at 40° C. under stirring. The reaction mass is then transferred into an autoclave and hydrogenated for 18 hours at 100° C. under 15 bars of hydrogen pressure. The cooled reaction mass is filtered through a cake of Tonsil® 414 FF as filter aid in a Buchner funnel. The solvent is distilled off under vacuum and 38.7 g of a light brown wax are collected. Softening range: 110–120° C.; GPC: $M_n$: 2051, $M_w$ 2972, $M_w/M_n$: 1.45.

The oligomer obtained can be represented by the following general formula

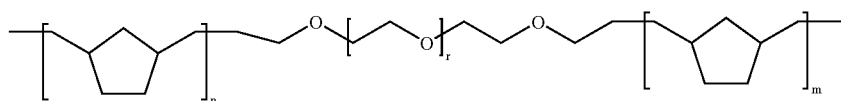

n, m: approximately 6; r: approximately 8 b) Preparation of the starting material
Preparation of the bivalent chain transfer agent (CTA)

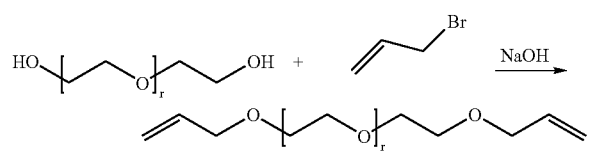

To a 250 ml round bottom flask, equipped with mechanical stirrer, condenser, thermometer, nitrogen inlet and dropping funnel, 30 ml of THF, 60 g of PEG 400 (MW 400) and 12.3 g of NaOH fine powder are given at room temperature. 63.5 g Allyl bromide (MW 120.98) are slowly added via the dropping funnel. The reaction is strongly exothermic. The temperature is maintained for two hours at 50–60° C. The reaction mass is cooled to room temperature, diluted with methylene chloride and washed with water to eliminate the salts. After evaporating the solvent the residue is distilled under vacuum and 69 g of viscous yellow oil are obtained (yield: approx. 95%).

Application Examples a) In order to determine the antifog properties of the tested compound in LDPE films, the compounds are incorporated in the polymer according to the following procedure: Samples from the compounds mentioned in Table 4 are weighed and added to LDPE pellets [Riblene® FF 29, Enichem Milano, Italy; density: 0.921 g/cm³; melt flow index: 0.6 (190° C./2.16 kg)] to give a mixture of 1% or 2% by weight of the test compound. The mixtures are mixed in a turbo mixer and extruded at the maximum temperature of 200° in an OMC twin-screw extruder. The granules obtained are press moulded for 3 minutes at 170° C. in a Pasadena press, which produces films of a thickness of about 150μ.

b) Films are evaluated according to the so-called hot fog test, which consists of immersing 250 ml glass beakers at 60° C. for about ½ of their height in a water bath. The beakers contain about 50 ml of water and on their top the films that have to be evaluated. The films are observed at defined intervals from the start of the experiment and a conventional rating with a range from A to E is assigned, on the basis of the appearance described in Table 3 below:

TABLE 3

| Rating for Hot Fog Tests | | | |
|---|---|---|---|
| Description | Performance | Rating | Comments |
| An opaque layer of small fog droplets | Fail | A | No visibility, poor light transmission |
| An opaque layer of large fog droplets | Fail | B | No visibility, poor light transmission |
| A complete layer of large transparent droplets | Poor | C | Poor visibility, lens effect, dripping |
| Randomly scattered large transparent droplets | Fair | D | Discontinuous film of water |
| Few small or large transparent droplets | Good | D/E | Discontinuous film of water, mostly transparent |
| A transparent film displaying no visible water | Excellent | E | Completely transparent | c) Films containing 1% or 2% of the additives are subjected to the Hot Fog Test. All films have the rating of A at the beginning of the experiment. They appear more transparent shortly afterwards and maintain their quality for a long period of time, followed by slow decaying. The persistency of performance for months under hot and wet conditions points to a long-term positive effect in the event that the films are used in greenhouses. Some Results are given in Table 4 below (h: hours):

TABLE 4

| Hot Fog Test Performance | |
|---|---|
| Compound | Performance |
| 2.2 (1%) | D or better for 1350 h; between C and D for further 1050 h |
| 2.4 (1%) | D or better for 1000 h; between C and D for further 1400 h |
| 2.4 (2%) | D or better for 2450 h; between C and D for a minimum of further 850 h |
| Control, no additive | From A to B after 30 minutes, no further change |

The invention claimed is:

1. A compound selected from the group consisting of

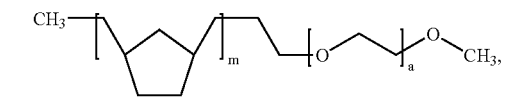

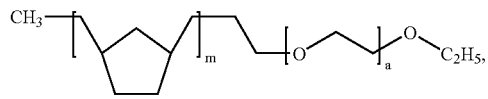

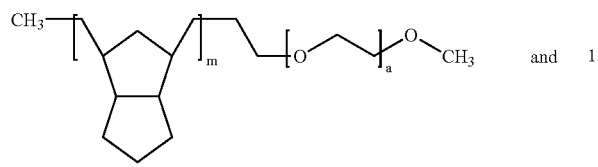 and

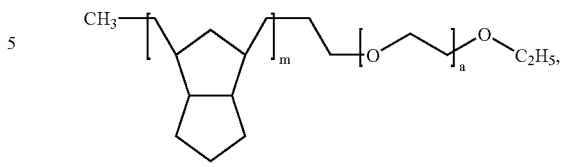

wherein m and a represent numerals from 5 to 20.

2. A method for increasing the antifog properties of polymers which comprises incorporating within film polymer material a compound according to claim 1.

3. A method according to claim 2, wherein the film material is a greenhouse or food packaging film material.

* * * * *